US008660861B2

(12) United States Patent  (10) Patent No.: US 8,660,861 B2
Chun et al.  (45) Date of Patent: Feb. 25, 2014

(54) ALLOCATION OF FINANCIAL INCENTIVES FOR EMPLOYEE WELLNESS PROGRAMS

(71) Applicant: FMR LLC, Boston, MA (US)

(72) Inventors: Don Chun, Bedford, NH (US); Christi R. Wise, Wilmette, IL (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 13/664,053

(22) Filed: Oct. 30, 2012

(65) Prior Publication Data

US 2013/0191141 A1  Jul. 25, 2013

Related U.S. Application Data

(60) Provisional application No. 61/590,214, filed on Jan. 24, 2012.

(51) Int. Cl.
*G06Q 50/00* (2012.01)
*G06Q 50/24* (2012.01)

(52) U.S. Cl.
CPC .................................. *G06Q 50/24* (2013.01)
USPC .................................................. 705/3; 705/4

(58) Field of Classification Search
CPC ........ G06Q 50/22; G06Q 40/00; G06Q 40/08
USPC ........................................................ 705/2–4
See application file for complete search history.

(56) References Cited

U.S. PATENT DOCUMENTS

| | | | |
|---|---|---|---|
| 6,038,553 A | 3/2000 | Hyde, Jr. | |
| 6,567,821 B1 | 5/2003 | Polk | |
| 7,072,909 B2 | 7/2006 | Polk | |
| 7,225,155 B1 | 5/2007 | Polk | |
| 7,362,902 B1 | 4/2008 | Baker et al. | |
| 7,406,441 B2 | 7/2008 | Kimura et al. | |
| 7,489,818 B2 | 2/2009 | Quick et al. | |
| 7,587,434 B2 | 9/2009 | Zou et al. | |
| 7,606,721 B1 | 10/2009 | Donnelly et al. | |
| 7,617,120 B2 | 11/2009 | Derasmo et al. | |
| 7,668,407 B1 | 2/2010 | Baker et al. | |
| 7,720,797 B2 | 5/2010 | Polk | |
| 7,730,066 B2 | 6/2010 | Bonham et al. | |
| 7,739,195 B2 | 6/2010 | Polk et al. | |
| 7,752,127 B2 | 7/2010 | Polk | |
| 7,752,131 B1 | 7/2010 | Polk | |

(Continued)

FOREIGN PATENT DOCUMENTS

CA  2533135 A1  7/2003
EP  978795 A2  7/1999

(Continued)

*Primary Examiner* — Mark Holcomb
(74) *Attorney, Agent, or Firm* — Proskauer Rose LLP

(57) ABSTRACT

System and method for providing participants, and in particular employees, a choice of how to allocate their non-typical benefits, i.e. earned reward amounts or incentives of an employee wellness program, and to manage these additional benefits in conjunction with other employee benefit programs such as health benefits, retirement benefits, 401(k) plans etc. in a manner that provides maximum benefit, interaction, and understanding of selected benefit allocation. The system provides increased user control to increase the perceived value of the rewards earned as well as increase to the participants' engagement in the behavior being incentivized. The system also provides a way to integrate various benefit programs providing a more user friendly and efficient system that encourages employee interaction and understanding.

22 Claims, 15 Drawing Sheets

(56) References Cited

U.S. PATENT DOCUMENTS

| | | |
|---|---|---|
| 7,765,549 B1 | 7/2010 | Lauer |
| 7,774,273 B2 | 8/2010 | Neal et al. |
| 7,788,173 B1 | 8/2010 | Polk |
| 7,809,638 B1 | 10/2010 | Polk |
| 7,856,617 B2 | 12/2010 | Szlam |
| 7,865,437 B2 | 1/2011 | Neal et al. |
| 7,877,423 B2 | 1/2011 | Polk |
| 7,958,034 B2 | 6/2011 | Ehrhart |
| 8,015,111 B2 | 9/2011 | Polk et al. |
| 8,065,168 B2 | 11/2011 | Szlam |
| 8,108,224 B2 | 1/2012 | Froude et al. |
| 8,340,979 B2 | 12/2012 | Zou et al. |
| 2002/0049617 A1* | 4/2002 | Lencki et al. .................. 705/4 |
| 2002/0103680 A1* | 8/2002 | Newman .......................... 705/4 |
| 2002/0156769 A1 | 10/2002 | Polk |
| 2003/0187768 A1* | 10/2003 | Ryan et al. .................. 705/35 |
| 2004/0064332 A1 | 4/2004 | Zou et al. |
| 2006/0045387 A1 | 3/2006 | Quick et al. |
| 2006/0136238 A1 | 6/2006 | Froude et al. |
| 2006/0157567 A1 | 7/2006 | Baumann et al. |
| 2007/0005494 A1 | 1/2007 | Polk |
| 2007/0250351 A1 | 10/2007 | Szlam |
| 2007/0260646 A1 | 11/2007 | Szlam |
| 2008/0300916 A1* | 12/2008 | Parkinson et al. ............... 705/2 |
| 2009/0089221 A1 | 4/2009 | Ehrhart |
| 2009/0099878 A1 | 4/2009 | Bonham et al. |
| 2009/0216671 A1 | 8/2009 | Polk |
| 2009/0271214 A1 | 10/2009 | Kandasamy et al. |
| 2009/0271351 A1 | 10/2009 | Kandasamy et al. |
| 2009/0271426 A1 | 10/2009 | Koya et al. |
| 2010/0042482 A1 | 2/2010 | Derasmo et al. |
| 2010/0223172 A1 | 9/2010 | Donnelly et al. |
| 2010/0228660 A1 | 9/2010 | Polk |
| 2010/0280951 A1 | 11/2010 | Polk et al. |
| 2010/0280967 A1 | 11/2010 | Neal et al. |
| 2010/0287094 A1 | 11/2010 | Polk |
| 2011/0055085 A1 | 3/2011 | Neal et al. |
| 2011/0208546 A1 | 8/2011 | Ehrhart |
| 2011/0208547 A1 | 8/2011 | Ehrhart |
| 2011/0208762 A1 | 8/2011 | Polk |
| 2011/0282786 A1 | 11/2011 | Polk et al. |
| 2012/0029952 A1 | 2/2012 | Szlam |

FOREIGN PATENT DOCUMENTS

| | | |
|---|---|---|
| EP | 978795 A3 | 7/1999 |
| EP | 1652156 A1 | 5/2006 |
| EP | 2036030 A2 | 3/2009 |
| JP | 2010166770 | 7/2010 |
| WO | 01/65396 A1 | 9/2001 |
| WO | 01/65396 A8 | 9/2001 |
| WO | 03/027810 A2 | 4/2003 |
| WO | 03/027810 A3 | 4/2003 |
| WO | 03/102726 A2 | 12/2003 |
| WO | 03/102726 A3 | 12/2003 |
| WO | 2004/012062 A2 | 2/2004 |
| WO | 2004/012062 A3 | 2/2004 |
| WO | 2004/031897 A2 | 4/2004 |
| WO | 2004/031897 A3 | 4/2004 |
| WO | 2004/032015 A1 | 4/2004 |
| WO | 2004/099926 A2 | 11/2004 |
| WO | 2004/099926 A3 | 11/2004 |
| WO | 2007/117640 A2 | 10/2007 |
| WO | 2007/117640 A3 | 10/2007 |
| WO | 2008/115425 A2 | 9/2008 |
| WO | 2008/115425 A3 | 9/2008 |

* cited by examiner

| Rewards | Maximize My Take Home Pay | Pay For Out Of Pocket Medical Expenses | Pay For Medical Expenses & Save For Retirement | Maximize My Savings For Retirement | HAS Contribution | 401k Contribution | Premium Reduction |
|---|---|---|---|---|---|---|---|
| $500 | $500 | $0 | $0 | $0 | $0 | 0% | $0 |
| $400 | $400 | $100 | $100 | $100 | $25 | 1% | $10 |
| $300 | $300 | $200 | $250 | $200 | $50 | 2% | $25 |
| $200 | $200 | $300 | $500 | $250 | $75 | 3% | $50 |
| $100 | $100 | $400 | $600 | $300 | $100 | 4% | $100 |
| $50 | 0 | 500 | 800 | 350 | $150 | 5% | $200 |
| $0 | -100 | 600 | 1,000 | 400 | $175 | 6% | $300 |
| | -200 | 700 | 2,000 | 450 | $200 | 7% | $500 |
| | -300 | 800 | 3,000 | 500 | | n | |

ALLOCATION OF FINANCIAL INCENTIVES FOR EMPLOYEE WELLNESS PROGRAMS

CROSS REFERENCE TO RELATED APPLICATION

This application claims the benefit of and priority to U.S. Provisional Patent Application No. 61/590,214, filed Jan. 24, 2012, the entire disclosure of which is incorporated herein by reference.

FIELD OF INVENTION

The technology relates generally to allocation of financial incentives for employee wellness programs, and, more particularly, to systems, methods, and computer program products for implementing an allocation procedure.

BACKGROUND

Typically, an employer offers employees benefits such as health insurance, health savings and reimbursement accounts, defined contribution retirement accounts, etc. Recently, employers have also started offering non-traditional benefits, such as wellness programs, discounts and various memberships. Wellness programs are offered to employees for various reasons, such as to improve employee health, reduce employee sick days and health related conditions, reduce employee absenteeism reduce employee health care costs overall, improve employee at-work productivity and to continue to be able to provide affordable health care coverage to employees. Wellness programs can include offering incentives or rewards to employees that participate in wellness activities or achieve certain wellness criteria. Incentives can be offered for completing such activities as health risk assessments, prevention activities, behavior modification programs, chronic condition management (management of diabetes or other conditions) or participating in health education programs (e.g., health fairs, seminars, individual or group counseling, and even online health resources). Prevention activities can include such activities as visiting doctors regularly or using risk identification tools such as biometric screenings including blood-pressure, cholesterol levels, body mass index, etc., or imaging technologies. Behavior modification programs can include health coaching, tobacco cessation, weight management, nutrition and diet, joining a gym, regular exercise, and workplace competitions/contests, etc. An incentive can be tied to indicators of success such as an employee's participation in, progress during, and/or completion of a program, or an employee attaining a certain health benchmark. For many employers, these same types of wellness programs have also been made available to the employee's spouses as well so that their activities can earn corresponding incentives as well.

Employers have generally provided for the systematic administration of typical benefits, allowing employees to sign up for each individual benefit separately, and/or allowing employees to manage each benefit via the benefit's particular system or website. As employers have started to provide non-traditional types of benefits, such as the ability to earn incentives described above, employers have yet to provide an efficient approach for administering these benefits and/or an approach that gives the employees sufficient interaction and control. Such non-traditional benefits, generally are paid out as cash or as a health care premium reduction, suffer issues of haphazard administration by employers and under-utilization by employees. Additionally, employers and/or plan sponsors do not currently give participants a choice of how to allocate their earned reward amounts or incentives. These shortcomings are also enhanced by the fact that current processes lack the ability to be customized to match the needs or interests of each particular employee. There is a need to give participants a choice of how to allocate their earned reward amounts or incentives to both increase the perceived value of the reward as well as to increase the participants' engagement in the behavior being incentivized. In addition, there is a need for an efficient system that allows the employee to manage his/her incentives in conjunction with other employee benefit programs such as health benefits, retirement benefits, 401(k) plans etc. in a manner that provides maximum benefit, appreciation, interaction, and understanding of a selected allocation of benefits.

SUMMARY OF THE INVENTION

The apparatus and methods consistent with this invention overcome the shortcomings and issues of typical systematic administration of benefits in the prior art by providing, in various embodiments, a system and process for allocating financial incentives for employee wellness programs. Allocation can be made to a pre-tax vehicle, such as a retirement plan or a health savings account (HSA), as well as other vehicles including cash, cash equivalent rewards, or health care premium reductions. Such additional allocation options provide the employee with the advantage of choosing which option is most valuable to the employee. For instance, one employee may choose to use earned incentives for their retirement plan while another employee may choose to obtain cash for their incentives to pay for health care costs such as co-pays or deductibles.

Defined contribution retirement plans include, but are not limited to, 401(k)'s, ROTH 401(k)'s, 403(b)'s and traditional IRA's. Health savings and reimbursement accounts can include, but are not limited to, HSAs, health reimbursement account (HRAs), retiree health reimbursement accounts (RHRAs), retiree medical accounts (RMAs), and flexible spending accounts (FSAs). Eligibility for the HSA contributions is limited to employees enrolled in a high-deductible health care plan (HDHP). Furthermore, employee wellness programs, generally, do not provide employees with the control to select to which vehicle to assign their incentives. Instead, the vehicle is typically mandated by the employer's plan design rules. The technology herein alternatively enables the employee to control which vehicle(s) to assign their incentives. The terms "employee," "participant," "client" and "user" are used interchangeably throughout. The terms "reward" and "incentive" are used interchangeably throughout. The terms "system" and "tool" are used interchangeably throughout.

In one embodiment, a computing device can receive input about an employee receiving financial incentives for completing a wellness activity or about their eligibility to receive a financial incentive. Completing a wellness activity can include the employee's participation in an activity, progress within an activity, completion of a wellness activity, or attainment of a health benchmark associated with a wellness activity. The input received by the computing device can include an amount of the employee's financial incentive, salary information, tax rate information, retirement plan contribution information, HSA contribution elections, estimates for medical expenses, employer match information, a growth rate, age, years to retirement or other benefits program information. The computing device can also receive an indication of eligibility for vehicles to which a financial incentive can be assigned. The vehicles can include a pre-tax vehicle and at least one other vehicle. The pre-tax vehicle can be a retirement plan or a health savings account. In some embodiments, the pre-tax vehicle is a retirement plan, and the other vehicle is a health savings account, an after-tax retirement plan, a cash reward or cash equivalent, or a health care premium reduction.

The computing device can then determine the advantages of allocating the incentives to one vehicle or another. To do so, the computing device determines to which vehicles the financial incentive can be applied based on the indication of the employee's eligibility. In certain embodiments, the indication of eligibility is calculated by the computing device based on the input. In other embodiments, the indication of eligibility is provided via input about the employee's selected benefit programs and/or contribution information. In certain embodiments, a user interface can include a selection tool for assigning the financial incentive to the pre-tax vehicle or the at least one other vehicle. In other embodiments, the selection tool on the user interface can additionally divide the financial incentives between the pre-tax vehicle and the at least one other vehicle. The selection tool can be a slider, a series of radio buttons, or other means for receiving user input. Selection via the selection tool applying the financial incentives to vehicle are received by the computing device and in some embodiments can be provided to a benefits manager so that the financial incentives can be applied to the vehicle or vehicles as selected. The user interface can include a first section or window of the user interface for the selection tool and a second section or window of the user interface to provide information to the user indicating advantages for selecting each vehicle such as tax savings, and matching contributions. In certain embodiments, the user interface can also limit incentives being allocated to a certain account based on the plan rules and regulatory limits for limiting contributions to those accounts. In certain embodiments, the user interface includes a link that can be activated by the user. The link can provide information indicating advantages for selecting each vehicle. In one embodiment, the link can be a roll-over link that causes a pop-up window to appear, which includes text explaining the advantage.

In some embodiments, the advantages can be quantified, and the computing device can utilize the input to determine the advantages. An advantage can include a statement regarding potential growth of the amount of the financial incentive if the particular vehicle is selected and can include after-tax take home for the incentive.

In some embodiments, in addition to receiving, via the selection tool, a selection for applying the financial incentive, the computing device can receive updates to employee contributions for various vehicles in which the employee is participating. In one embodiment, such updated contribution selections can also be transmitted to a benefits manager so the contribution selections can be applied to the selected vehicle or vehicles. The benefits manager can be an employee of the employer, or can be benefits program management partner, such as an outside vendor. In other embodiments, such updated contribution selections can be transmitted to a record keeping system maintained by the corresponding benefit program.

In some embodiments, the computing device can receive input about the eligibility of an employee and receive an anticipated financial incentive amount for completing a wellness activity. The computing device can also receive an indication of eligibility for vehicles to which the anticipated financial incentive can be assigned. The vehicles can include a pre-tax vehicle and at least one other vehicle. The pre-tax vehicle can be a retirement plan or a health savings account. In some embodiments, the pre-tax vehicle is a retirement plan, and the other vehicle is a health savings account, an after-tax retirement plan, a cash reward or cash equivalent, or a health care premium reduction. The computing device can then determine which vehicles the anticipated financial incentive could be applied based on the indication of eligibility received. To do so, the computing device determines to which vehicles the financial incentive can be applied based on the indication of the employee's eligibility. In certain embodiments, the indication of eligibility is calculated by the computing device based on the input. In other embodiments, the indication of eligibility is provided via input about the employee's selected benefit programs and/or contribution information. In certain embodiments, the computing device provides a user interface that can include a selection tool for viewing the anticipated financial incentive as allocated to the pre-tax vehicle or the at least one other vehicle. In other embodiments, the selection tool on the user interface can additionally divide the anticipated financial incentives between the pre-tax vehicle and the at least one other vehicle. The selection tool can be a slider, a series of radio buttons, or other means for receiving user input.

Other aspects of the invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention as well as the invention itself, will be more fully understood from the following description of various embodiments, when read together with the accompanying drawings.

FIG. 4 shows an exemplary table of results, i.e. calculated possible outcomes by the computing device, given input received via an employee selection and/or vehicle databases.

DETAILED DESCRIPTION

Figure 1:
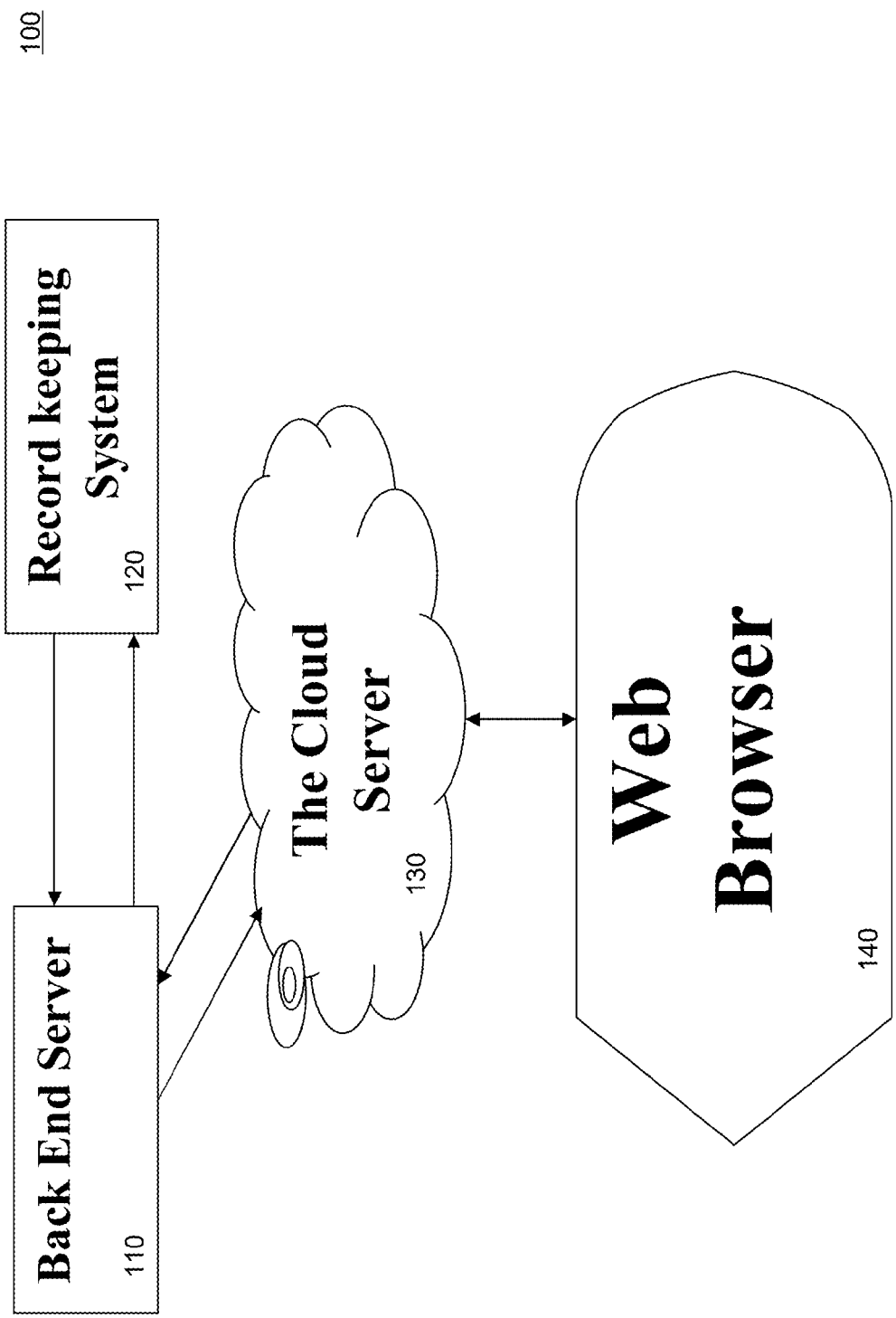
FIG. 1 is an overhead data flow diagram of one embodiment of the invention for updating and preserving data and employee selections.

FIG. 1 shows a high level data flow 100 according to one embodiment of the invention. The system gathers various inputs from various sources, including but not limited to, the user interface, selected databases, and/or other memory locations, with a goal of pre-calculating a set of results based on employee or user selections on a browser based application or user interface (UI) tool 270 for allocation of financial incentives and benefit contributions. When the tool is initiated by an employee, a signal is sent to the server 130 to gather data from connected benefit sources to provide financial incentives and benefit contribution information to the user via the user interface 270. Once the data is gathered, financial incentives, benefit contribution, and matching contributions, are calculated for the employee. There is a finite number of calculations to be made based on the data gathered, which in turn provides a finite number of results. In one embodiment, these results are formulated into a table 400 that is then sent down to the browser 140, where it can be loaded into the browser's 140 memory and cached so the results are then readily and easily accessible. In another embodiment, these results can be calculated and saved onto the user's computer to then be read from the user's computer memory. In this embodiment, as updates on the user interface 270 are made, results from the table 400 are sent to the browser 140. In another embodiment, these results can be calculated and saved onto the employer's or benefit provider's resources. In this embodiment, as updates on the user interface 270 are made, results from the table 400 are again sent to the browser 140. In any of these embodiments, as the user changes between scenarios on the user interface 270, the browser can update information on the user interface 270 via information pulled from the table 400.

In one embodiment, as the user updates fields that correspond to a selected scenario, such as a contribution amount, the browser 140 sends message updates to the cloud server 130 to update edited fields within the corresponding record keeping system 120. These message updates subsequently result in an update transaction to the field's record on the record keeping system 120. In one embodiment, the records are kept securely, i.e. the cloud server request to update a field must go through a back end server 110 to the record keeping system 120 as an extra layer of protection for stored personal data related to the user. After the record is updated in the record keeping system 120, a message regarding a successful or unsuccessful update is sent back to the cloud server 130, which in turn passes the message to the browser 140. The browser 140 then displays the message regarding the success of the update to the user. As the actual data or records are kept on the record keeping system 120, any edited data in a field on the user interface 270 that is not updated and recorded back to the record keeping system 120 is lost or deleted when the user exits the user interface 270 and/or the browser 140.

Figure 2:
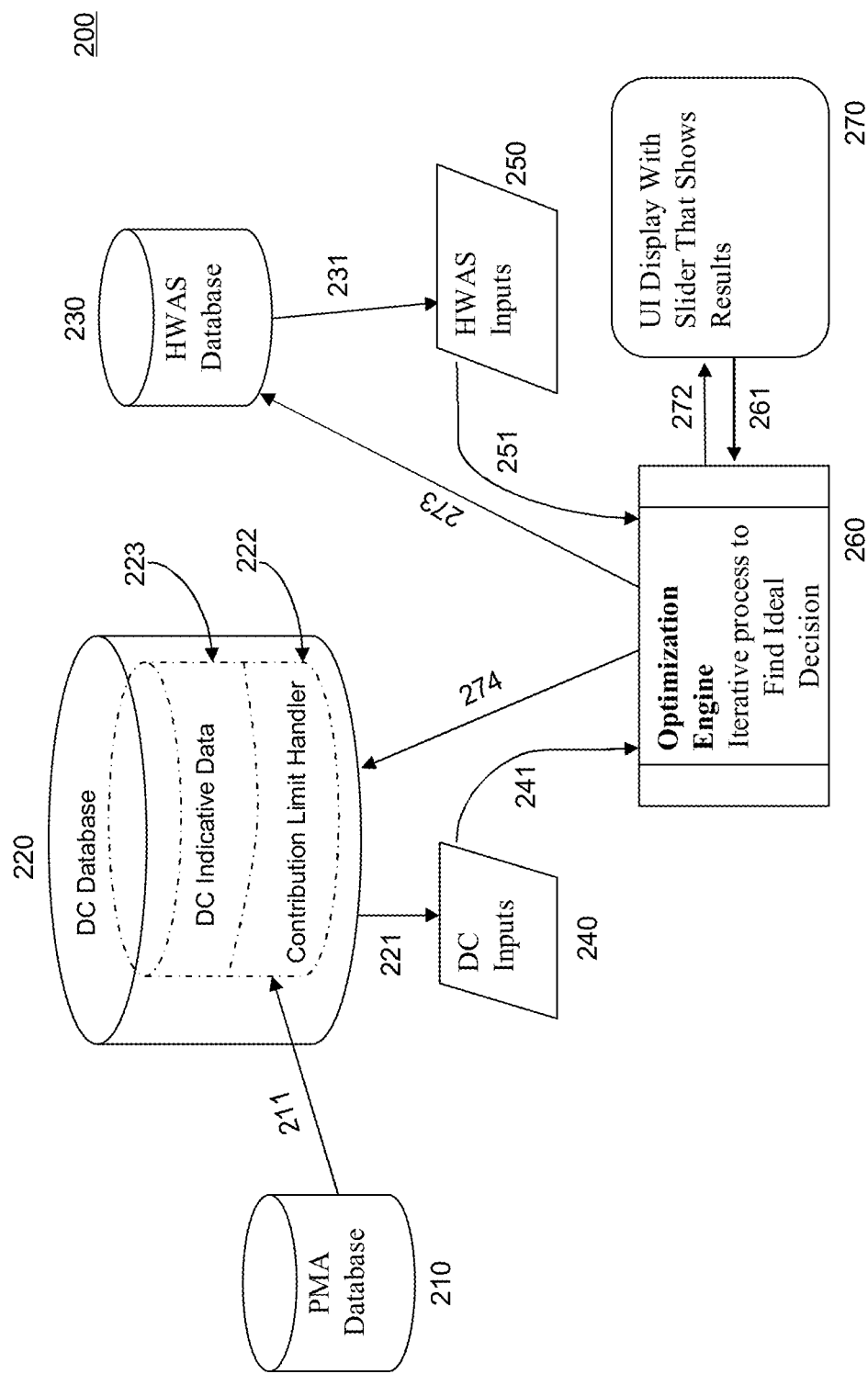
FIG. 2 is a block diagram of one embodiment of the invention.

FIG. 2 shows an in-depth overview 200 of one embodiment of the invention. As shown, the user interface 270 communicates with an optimization engine 260. The optimization engine 260 gathers the data from the available sources 210, 220, 230, 270 to provide financial incentives and benefit contribution information to the user on the user interface 270. It is understood that other sources of data may be available (i.e. may be incorporated into the system and interact with the tool) in addition to the databases 210, 220, 230 and user interface 270. Once the optimization engine 260 gathers the data, the optimization engine 260 iterates through the possible scenarios given the data gathered (i.e. completes the finite number of calculations based on the data gathered) and produces a finite number of results. These results are loaded into a table to be provided (at 272) to the user interface 270 on the browser 140. Inputs can be stored and/or retrieved from a database, or can be received as user input. In some embodiments, user input is received at the user interface 270 and sent (at 261) to the optimization engine 260 for determination of next action, calculations and/or storage. Outputs 272 from the optimization engine 260 are received at and displayed on the user interface 270. The optimization engine outputs 272 include a combination of relayed inputs 241, 251 received from interacting databases 210, 220, 230 and calculations based on inputs 241, 251, 261 received from interacting databases 210, 220, 230 and the user interface 270. The user interface 270 has the capability of requesting information (at 261) from the optimization engine 260. Likewise, the optimization engine 260 has the capability of requesting information (at 272, 273, 274) from the databases 210, 220, 230 and the user interface 270.

In one embodiment, inputs 250 from the Health and Welfare Administration Systems (HWAS) database 230 are collected (at 231) for the particular user and provided (at 251) to the optimization engine 260. Such inputs can include information on an employee's healthcare plan type, healthcare plan details for single or family options, number of dependants, cost of plan per period, qualified payment amounts to healthcare providers, other benefit plan types, pensions, payroll, long term care insurance, life insurance, or any other healthcare or benefit information the employee has or has elected that is not otherwise kept in another database. Additionally, such inputs collected (at 231) from within the HWAS database 230 can be financial incentive information, anticipated financial incentive information based on eligibility, or rewards information such as total reward potential, type of reward earned, or amount of reward earned. Further, such inputs collected (at 231) from within the HWAS database 230 can be any prior election regarding healthcare or benefits information previously elected via the employee's scenario choices or customizations on the user interface 270 and saved back (at 261, 273) to the originating record keeping system 120 and/or the record keeping system 120 containing similar records for the user, i.e. the HWAS database 230.

In one embodiment, inputs 240 from the Defined Contribution database (DC database) 220 are collected (at 221) for a particular employee and provided (at 241) to the optimization engine 260. Such inputs 240 can include information from both the Defined Contribution Indicative Data (DCID) 223, and the Contribution Limit Handler (CLH) 222. Information in the DCID 223 can include the employee's individual participant data such as the employee's current 401(k) contribution and current Roth 401(k) contributions, i.e. the employee's 401(k) contribution elections. Information from the DCID 223 is provided to the CLH 222 in addition to being provided (at 241) to the optimization engine 260. Additionally, any incentive information provided (at 251) to the optimization engine 260 is in turn relayed (at 274) to the CLH 222. The CLH 222 further receives (at 211) information from the Plan Matching Rules database (PMA) 210 regarding the employee's contribution and matching rules.

In some embodiments, the PMA 210 provides the employee's specific contribution limitations as well as any rules or limitations imposed by the employee's plan or employer. Such rules can be with regard to the employee's potential incentives, matching contributions to the employee's own contributions as well as matching contributions to the employee's earned incentives. For example, the PMA 210 might provide (at 211) information such as the user's enrollment in a HDHP, the user's eligibility for HSA contributions dependant on the user's enrollment in a HDHP, the maximum allowable HSA amount based on the current knowledge of HSA deferral elections, HSA federal limits, the maximum allowable retirement amount based on retirement account limits, the matching potential of the user, i.e. the amount(s) that stop additional matching by the employer including any corresponding tier system, matching rules for other contributions, plan eligibility requirements, reward or incentive options, reward eligibility requirements, reward limitations, percentages taxable that are defaulted but can be altered by the user, and projected percentages for contributions that again are defaulted but can be altered by user selection. The CLH 222 in turn takes the input from the PMA 210, the DCID 223 and/or the optimization engine 260 and calculates the matching contributions to the employee's existing 401(k) contributions, the matches to the employee's incentive amounts, and any other calculations relating to the limitations of such contributions or matches. Calculations from the CLH 222 as well as the information from the PMA and the DCID are collected (at 221) and provided (at 241) as DC Database inputs 240 to the optimization engine 260.

Figure 3:
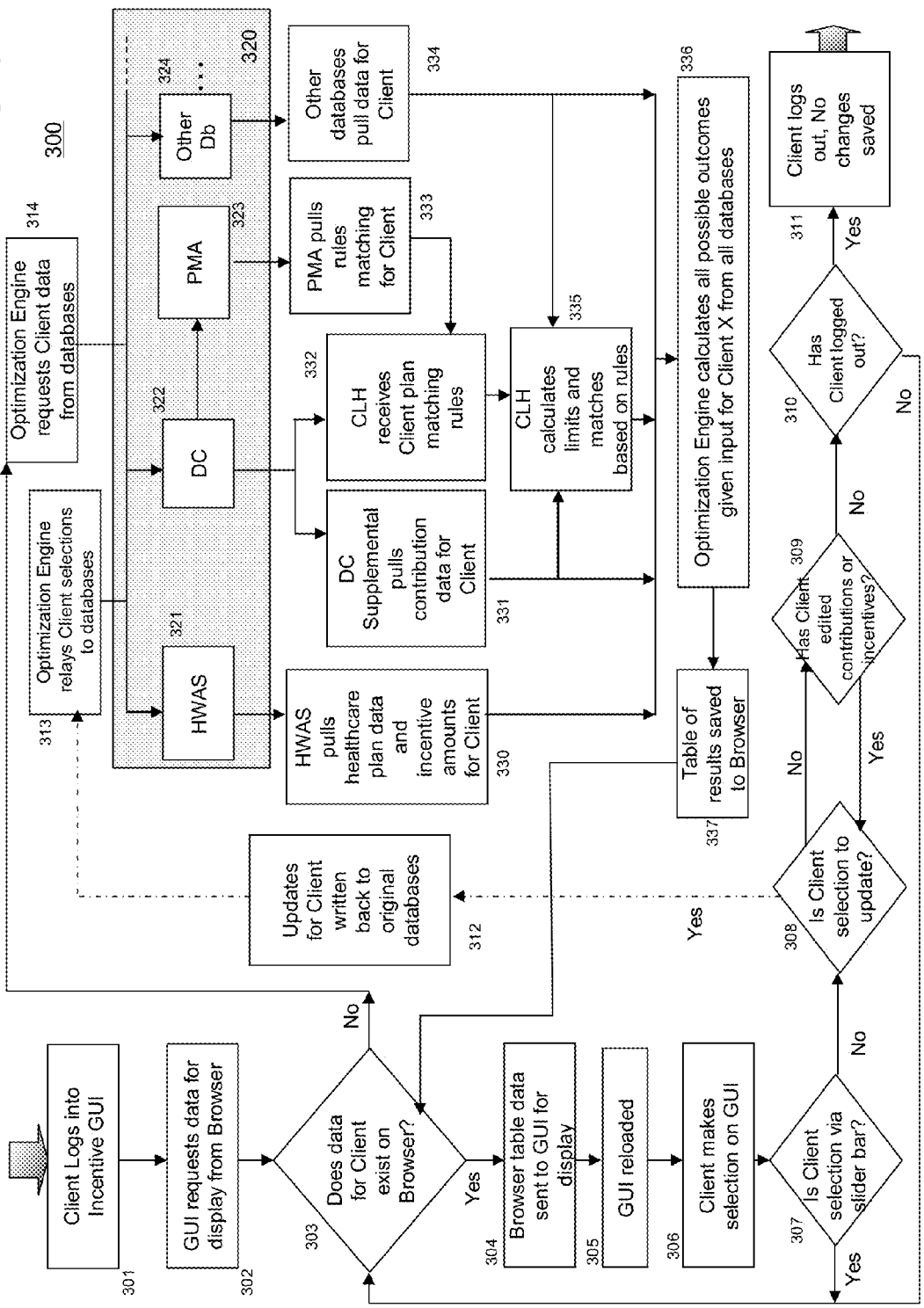
FIG. 3 is a detailed data flow diagram of another embodiment of the invention.

FIG. 3 is a detailed flow diagram 300 of another embodiment of the invention. The flow diagram 300 demonstrates the user allocation process from user log-in 301 to user log-out 311. It is understood that other sources of data for this process may be available (i.e. may be incorporated into the system and interact with the tool) in addition to the depicted databases 210, 220, 230 and user interface 270. As shown more clearly in the flow diagram 300, other databases 324 within the available databases 320 can be interconnected and interact with the system to provide additional data to the CLH 222 to calculate limits and matches 335 and/or can be interconnected and interact with the optimization engine 260 to calculate scenario results 336.

In some embodiments, when the user logs into the web browser application 140 via the graphical user interface (GUI) 301, the GUI 270 requests 302 data for display from the browser 140. The browser 140 checks 303 whether the client has data loaded into the browser table from the record keeping system 120. When the user initially logs in 301, any data previously on the browser 140 was deleted when the previous user exited 311 the user interface 270. Thus, no data exists at this stage of the process, and the request is relayed to the optimization engine 314 to request the client's data from the databases 320. The optimization engine 260 then requests 314 data from the databases 320, such as the HWAS database 230, 321, the DC Database 220, 322, the PMA 210, 323, and any other interconnected and interacting databases 324. Upon such request 314, the databases 320 individually pull the related information for the client from their records 330, 331, 333, 334. In some embodiments, this means the HWAS database 321 pulls healthcare plan data and incentive data for the client 330; the DC database 322 pulls contribution data for the client 331; the PMA 323 pulls the rules and matching limitations for the client 333; and the CLH 222 receives the client rules and limitations from the PMA 332 and calculates the limitations and matching potentials based on the rules from the PMA 335. Relevant data for the client as pulled or calculated 330, 331, 333, 334, 335 is then provided to the optimization engine 260, which calculates the possible results given the provided input 336. These results are then formulated into a table and saved to the browser 337. Receiving the table, the browser then provides the table to the GUI 270 for display on the GUI 304. The GUI or user interface 270 reloads to display the new data 305. The client can view the data and make scenario selections or edit fields as available within various scenarios.

In one embodiment, if the client makes a scenario selection 307, the possible results have already been calculated 336 for the client via the data pulled from the databases 320. As such, the data for the selected scenario can simply be retrieved from the browser table. Thus, upon a scenario selection, the browser locates the saved table 303 and sends the data for the scenario selected to the user interface 304. The user interface is reloaded 305 to display the new scenario and corresponding data. If the user then selects to update their elections based on the selected scenario 308, this selection 306 must be written back to the originating database(s) handling the election 312. Thus, a selection to update given a selected scenario 306 can be relayed through the optimization engine 313 to the appropriate database 320. If, however, the user selection 306 is an edit to a field within a scenario 309, such as a contribution amount or incentive amount, this user edit requires the recalculation of data within the table 336. Such a user selection 306 editing a field within the scenario sends the new field value back through the optimization engine 312 to the databases 320 for recalculation 335 given the newly edited field data. The new data is fed to the optimization engine again for recalculation of the results 336 and the table is reloaded to the browser 337. The user interface is reloaded with the new results 303-305 to display the new data corresponding to the scenario and updated field value.

In this embodiment of FIG. 3, if the user selection 306 is not a scenario selection 307, an update 308, or a field edit 309, the system assumes the selection is the client's selection to log out 310 and the client is logged out 311. It is understood, however, that other user selections may be available on the user interface than those provided in the flow diagram 300. Additionally, it is understood that in other embodiments, the system need not assume the selection is the client's selection to log out 310 if no other selection is apparent.

FIG. 4 shows an exemplary table 400 created by the optimization engine 260 and saved to the browser 337. In addition, FIG. 4 provides an example of data saved in the table as well as the functions or calculations performed by the optimization engine 260 according to one embodiment. The optimization engine 260 can be configured to perform any number of calculations 336 relating to allocation of financial incentives and benefit contributions. In one embodiment, the optimization engine 260 performs at least several functions, including using incentives to maximize take home pay, using incentives to pay for out of pocket medical expenses, using incentives to pay for medical expenses, apportion incentives to pay for medical expenses while also saving for retirement, and using incentives to maximize savings for retirement.

The function of maximizing take home pay provides the user with a scenario that maximizes the amount of money received from an incentive or reward. In one embodiment, this maximizing take home pay calculation can be configured to determine the amount of applicable taxes and provide the user with an amount of maximized take home pay that reflects the amount received after tax. The function of paying for out of pocket medical expenses provides the user the ability to apply their incentive or reward amounts toward various medical expenses. In some embodiments, this paying for out of pocket medical expenses can be configured to allocate the incentive towards deductibles, co-pays, co-insurance payments, or a combination of such payments. The optimization engine 260 can also provide the user the ability to apply incentives toward medical insurance or other insurance premiums as seen in the example table 400. The function of paying for medical expenses while saving for retirement can be configured to apportion a percentage of the reward amount to cover medical expenses with the remaining percentage being applied to a retirement account. In one embodiment, the optimization engine 260 can be configured to calculate 336 the most beneficial percentages to apportion the retirement account and medical expenses based on the inputs from the databases 320 for this particular user. In another embodiment, the function of paying for medical expenses while saving for retirement can be configured to apportion equal percentages to the retirement account and to medical expenses. The function of maximizing the user's savings for retirement provides the user the ability to allocate their incentives to an HSA account, retirement account or some combination of such accounts. In one embodiment, the optimization engine 260 may provide the user the capability of allocating incentives towards their elected HSA contributions or 401(k) elected contributions. These functions, or additional ones, are calculated by the optimization engine 260 for the possible data entries, i.e. a finite number of calculations, the results of which are loaded into a table 400 and provided to the browser 304 for the user interface's ease of access upon user scenario selections.

FIGS. 5A-9B provide views of an exemplary user interface for implementing the process for allocating financial incentives for employee wellness programs. One set of example data is used throughout these exemplary views. The financial incentive earned by the participant and available for allocation in this example is $250. In one embodiment, the user interface includes a scenario selection tool in the form of a slider bar which allows the user to select between scenarios, i.e. vehicles for allocation. Vehicles available are at least the optimization engine functions described above and are labeled in FIGS. 5A-9B as 1) Maximize My Take Home Pay, 2) Pay for Out-of-Pocket Medical Expenses, 3) Pay for Medical Expenses & Save for Retirement, and 4) Maximize My Savings for Retirement.

Figure 5A:
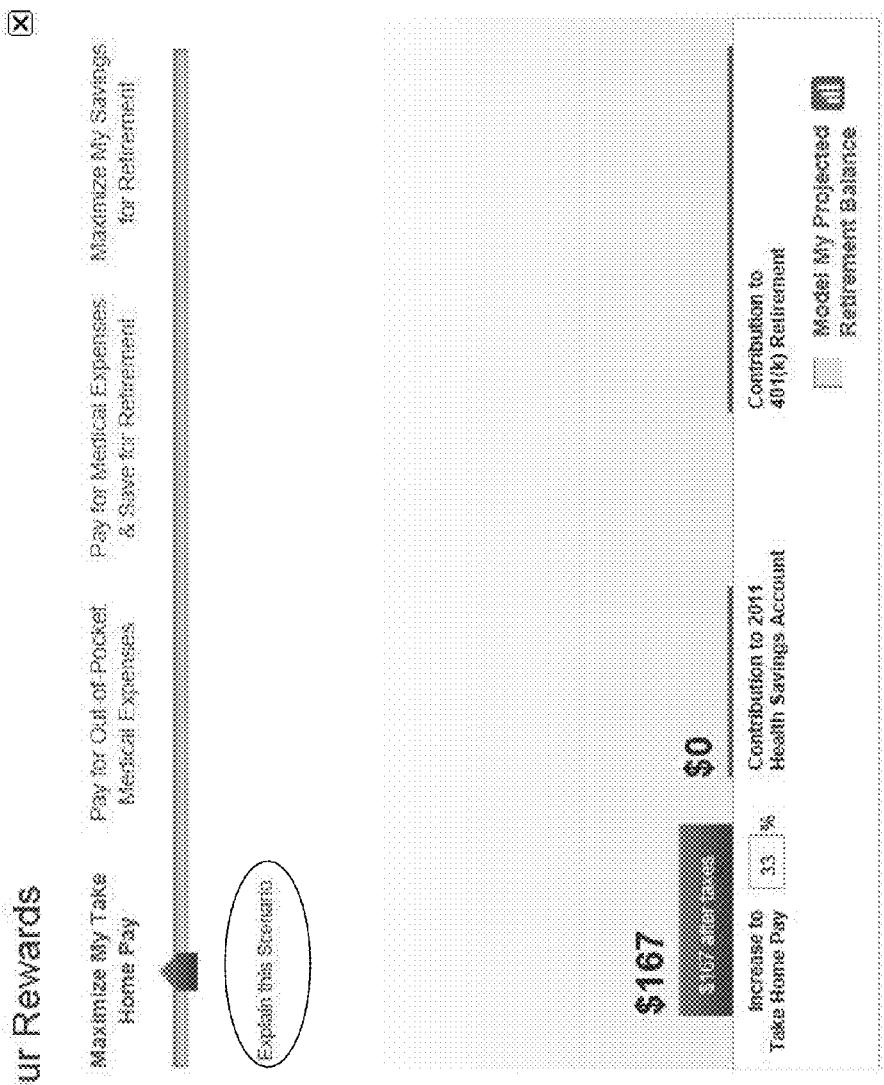
FIG. 5A illustrates one embodiment of the user interface with a sliding bar, in which the sliding bar is set to maximize the employee's take home pay and provides the calculated result based on input.
Figure 5B:
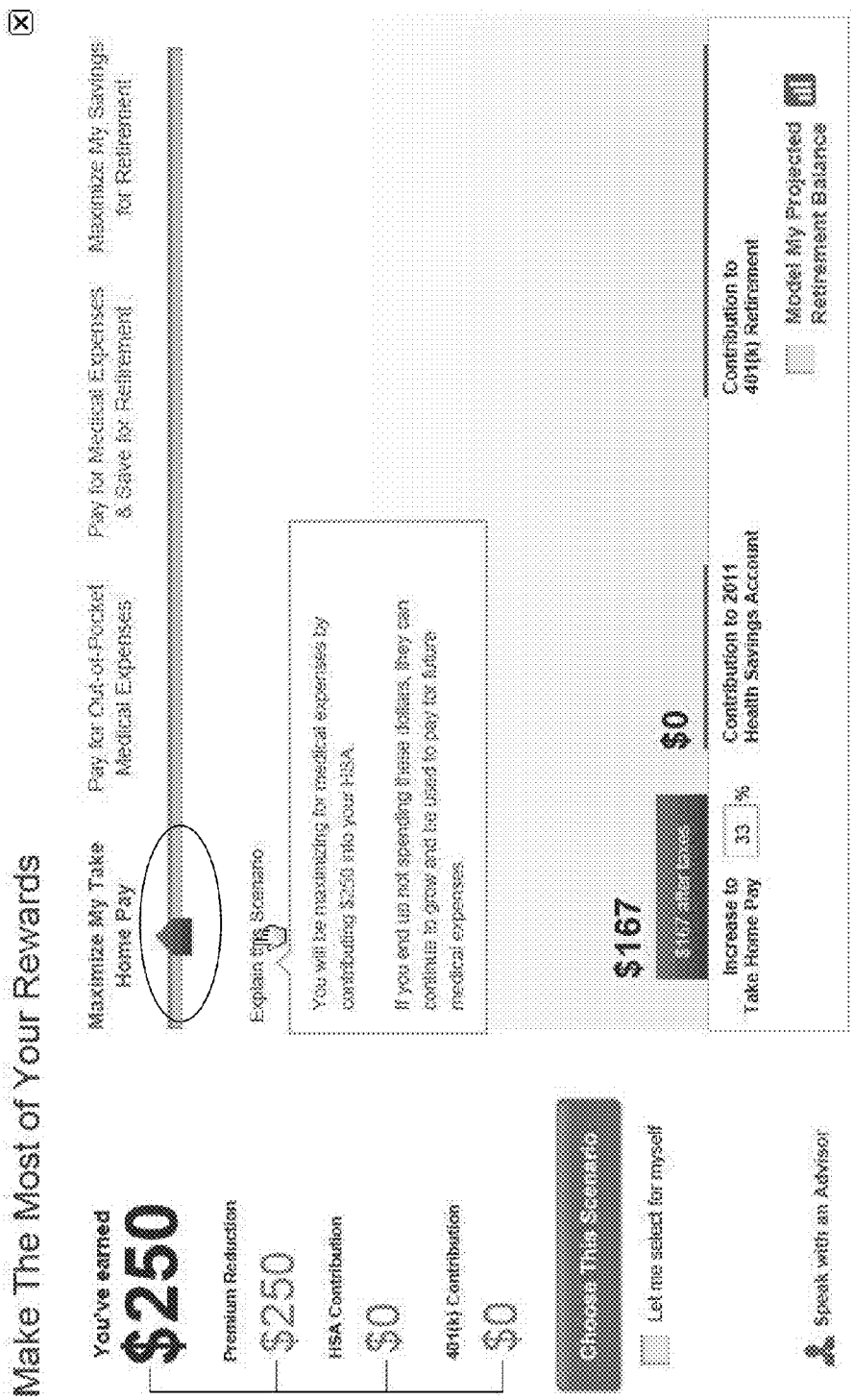
FIG. 5B illustrates one embodiment of the user interface with a sliding bar, in which the sliding bar is set to maximize the employee's take home pay and a roll-over link is provided causing a pop-up window to appear, which explains the advantage of this vehicle selection.

In another embodiment, the user interface can be user friendly to encourage active participation from employees. In one such embodiment, the user interface can be user friendly by providing easy access to explanations of the different scenarios selectable by the user. For example, FIG. 5A shows a rollover link labeled "Explain this Scenario." This rollover link can be configured to provide the user with easy access to an explanation of the scenario currently selected. In FIG. 5B, the link has been activated and explains advantages of making the current scenario selection, i.e. explains the advantages of selecting Maximize My Take Home Pay. In this embodiment, the user interface is also user friendly by calculating the take home reward amount after-tax for this incentive allocation as shown in FIGS. 5A-5B. When the user has viewed the vehicle's advantages and wishes to select the scenario 306 and save that scenario to their records 308, the user can update their records by selecting the "Choose This Scenario" button as shown in FIG. 5A-9B.

Figure 6A:
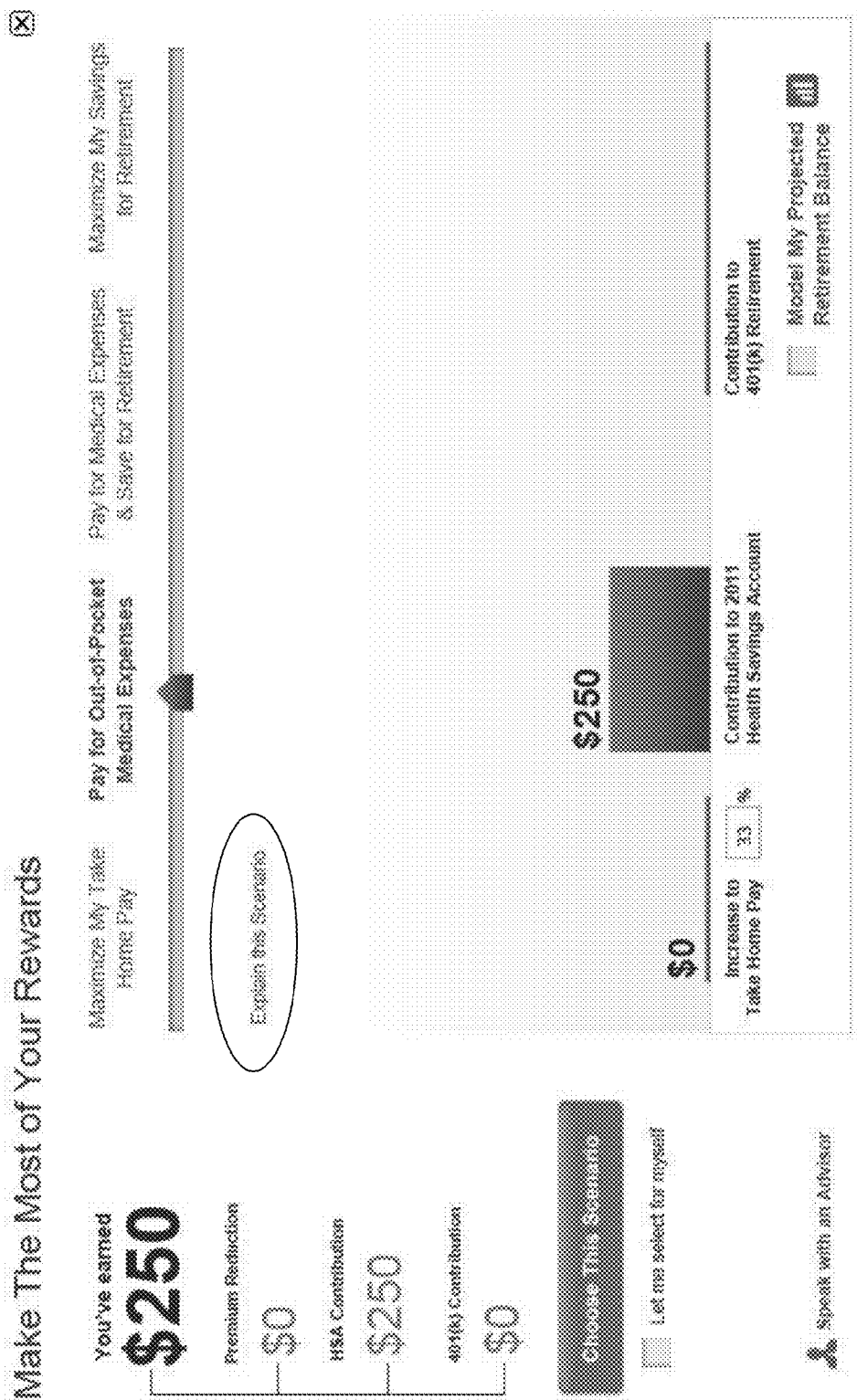
FIG. 6A illustrates one embodiment of the user interface with a sliding bar, in which the sliding bar is set to pay for the employee's out of pocket medical expenses and provides the calculated result based on input.
Figure 6B:
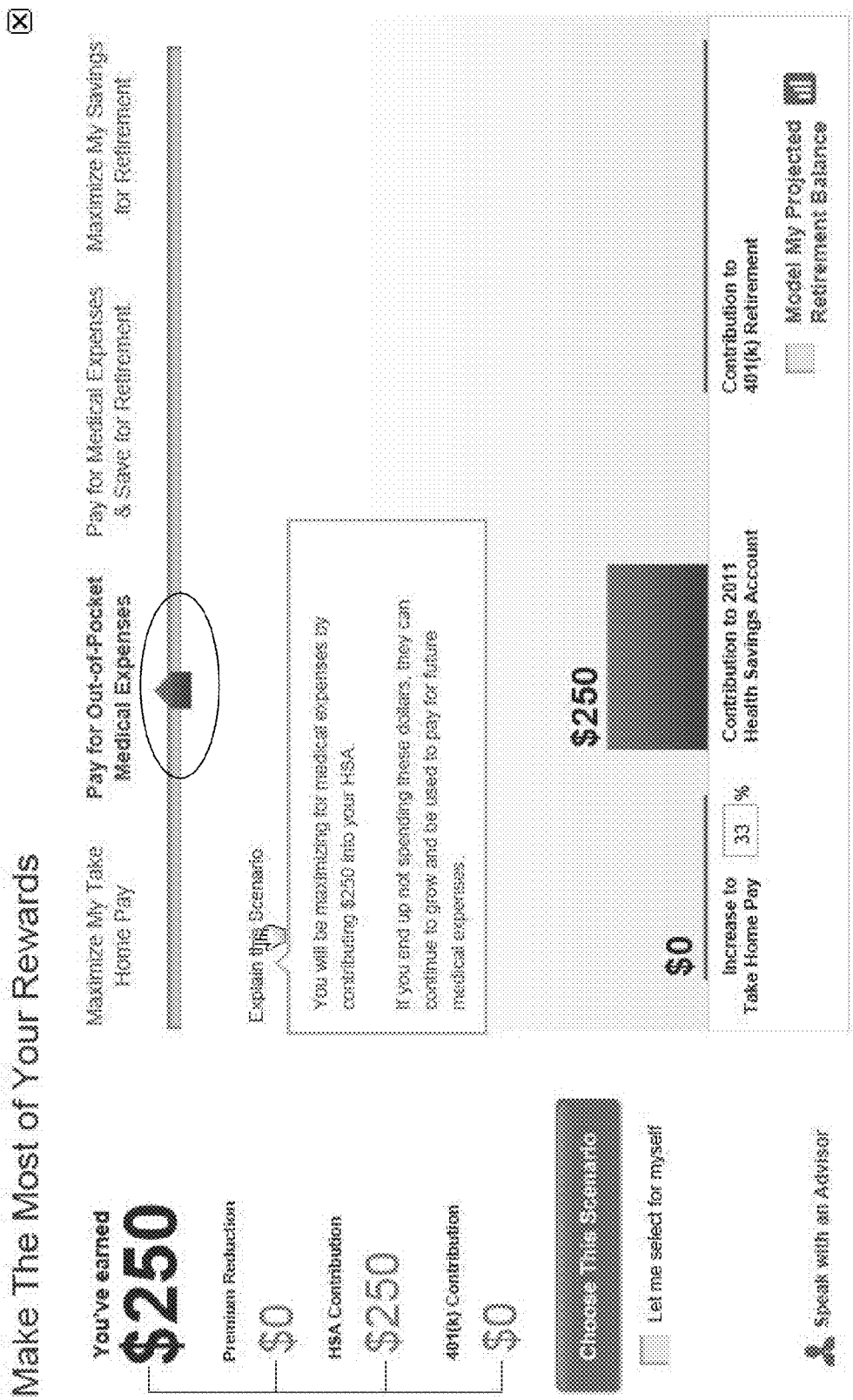
FIG. 6B illustrates one embodiment of the user interface with a sliding bar, in which the sliding bar is set to pay for the employee's out of pocket medical expenses and a roll-over link is provided causing a pop-up window to appear, which explains the advantage of this selection.

FIGS. 6A and 6B show the scenario selection tool moved to "Pay for Out-of-Pocket Medical Expenses." Upon the user's selection 306 via the sliding bar, the user interface 270 requests (at 272) new data corresponding to the selection 307. The data previously saved into the browser table 337 by the optimization engine 260 is accessed 304, and the user interface is reloaded 305 with data corresponding to the new scenario selection, i.e. the Pay for Out-of-Pocket Medical Expenses scenario given the data provided. As explained by the user friendly "Explain this Scenario" rollover link, activated in FIG. 6B, the user uses this vehicle to maximize the payment of their medical expenses by contributing the earned incentive of $250 to their HSA.

Figure 7A:
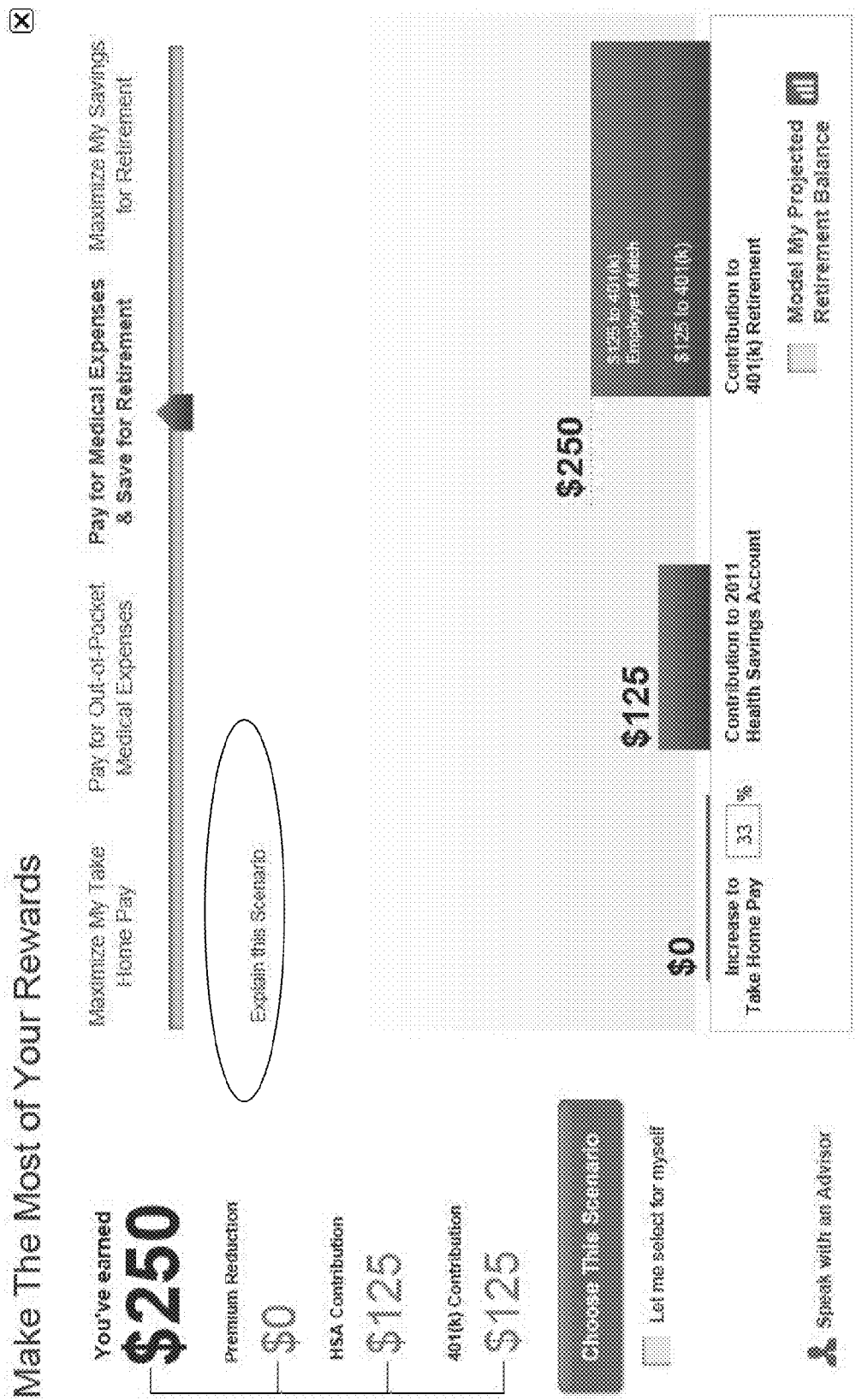
FIG. 7A illustrates one embodiment of the user interface with a sliding bar, in which the sliding bar is set to pay for the employee's medical expenses as well as save for retirement and provides the calculated result based on input
Figure 7B:
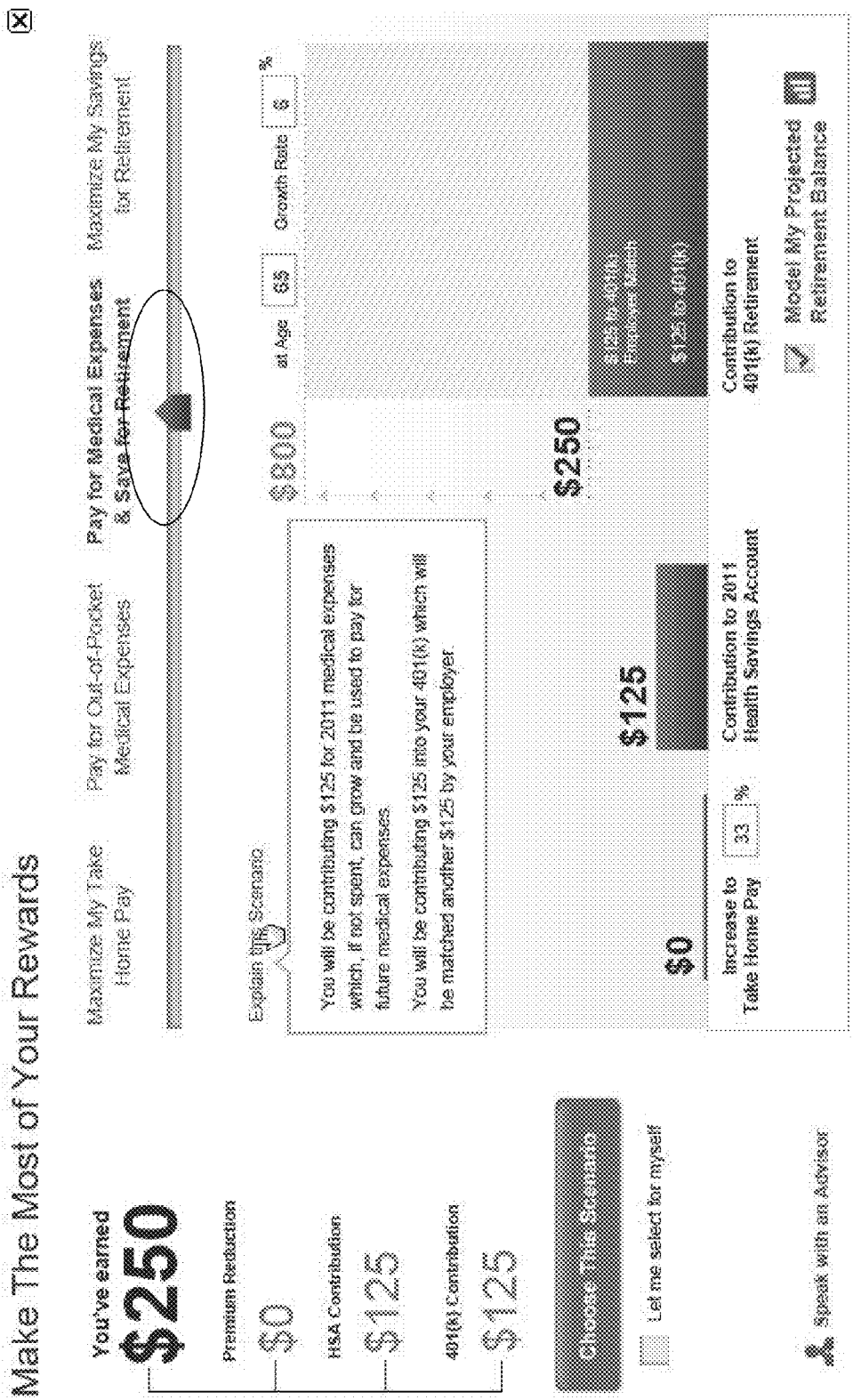
FIG. 7B illustrates one embodiment of the user interface with a sliding bar, in which the sliding bar is set to pay for the employee's medical expenses as well as save for retirement, and a roll-over link is provided causing a pop-up window to appear, which explains the advantage of this selection.
Figure 8A:
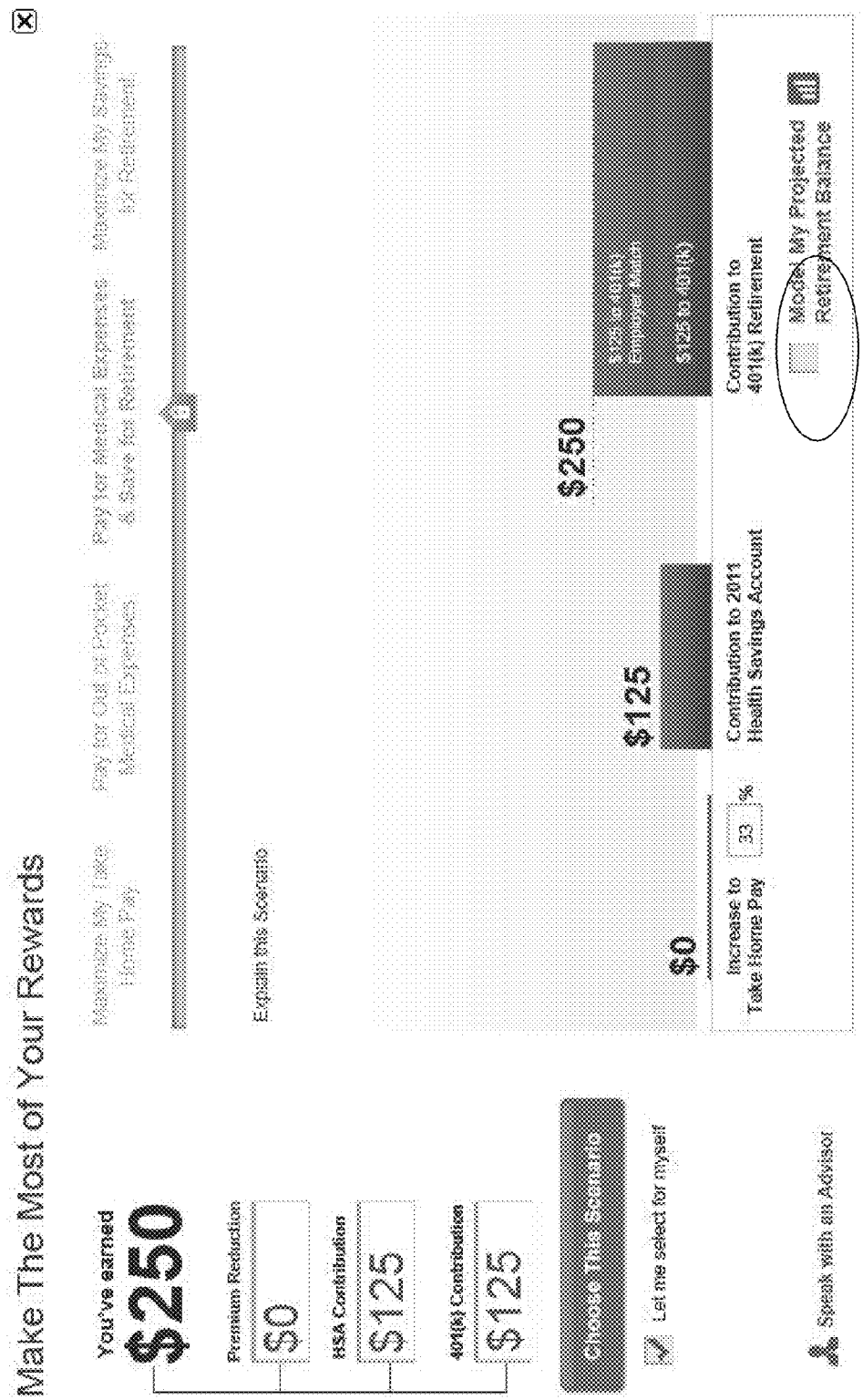
FIG. 8A illustrates one embodiment of the user interface with a sliding bar, in which the employee has selected to update contribution elections independent of benefit input received from a record keeping system thereby locking the sliding bar.

FIGS. 7A to 7B show the scenario selection tool moved to "Pay for Medical Expenses & Save for Retirement." FIG. 7A specifically shows how incentives allocated to the retirement savings result in a company match. Upon the user's selection 306 via the sliding bar, the user interface 270 requests (at 272) new data corresponding to the selection 307 of scenario Pay for Medical Expenses & Save for Retirement. The data previously saved into the browser table 337 by the optimization engine 260 is accessed 304, and the user interface is reloaded 305 with data corresponding to the new scenario selection given the data provided. As explained by the user friendly "Explain this Scenario" rollover link, activated in FIG. 7B, the user has contributed the earned incentive of $250 by allocating half of their incentive, or $125, to their medical expenses via their HSA and the other half of the user's incentive to the user's retirement savings via the user's 401(k). Moreover, as shown in FIG. 7A, the user's contribution of $125 to their retirement savings has resulted in an employer match of $125 such that the total amount allocated to the retirement savings is $250. FIG. 7B also shows the calculated value of the employer's match to the user's 401(k) contribution, which is made available to the user by apportioning part of the user's incentive to the user's retirement savings. In one embodiment, the user interface is informative by providing the user a projected growth model of the allocation to retirement for the user's contribution given a projected retirement age and projected growth rate. In one such embodiment, exemplified in FIG. 7B, the user interface is user friendly by allowing the user to select, via a radio button, whether the user wants to view the projected retirement balance and allows the user to input their desired retirement age and growth rate percentage. FIG. 7B shows this radio button, entitled "Model My Projected Retirement Balance," selected such that the projected retirement balance, retirement age, and projected growth rate are viewable by the user. FIG. 8A shows this Model radio button being unselected such that the projected retirement balance, retirement age, and projected growth rate are no longer viewable to the user.

Figure 8B:
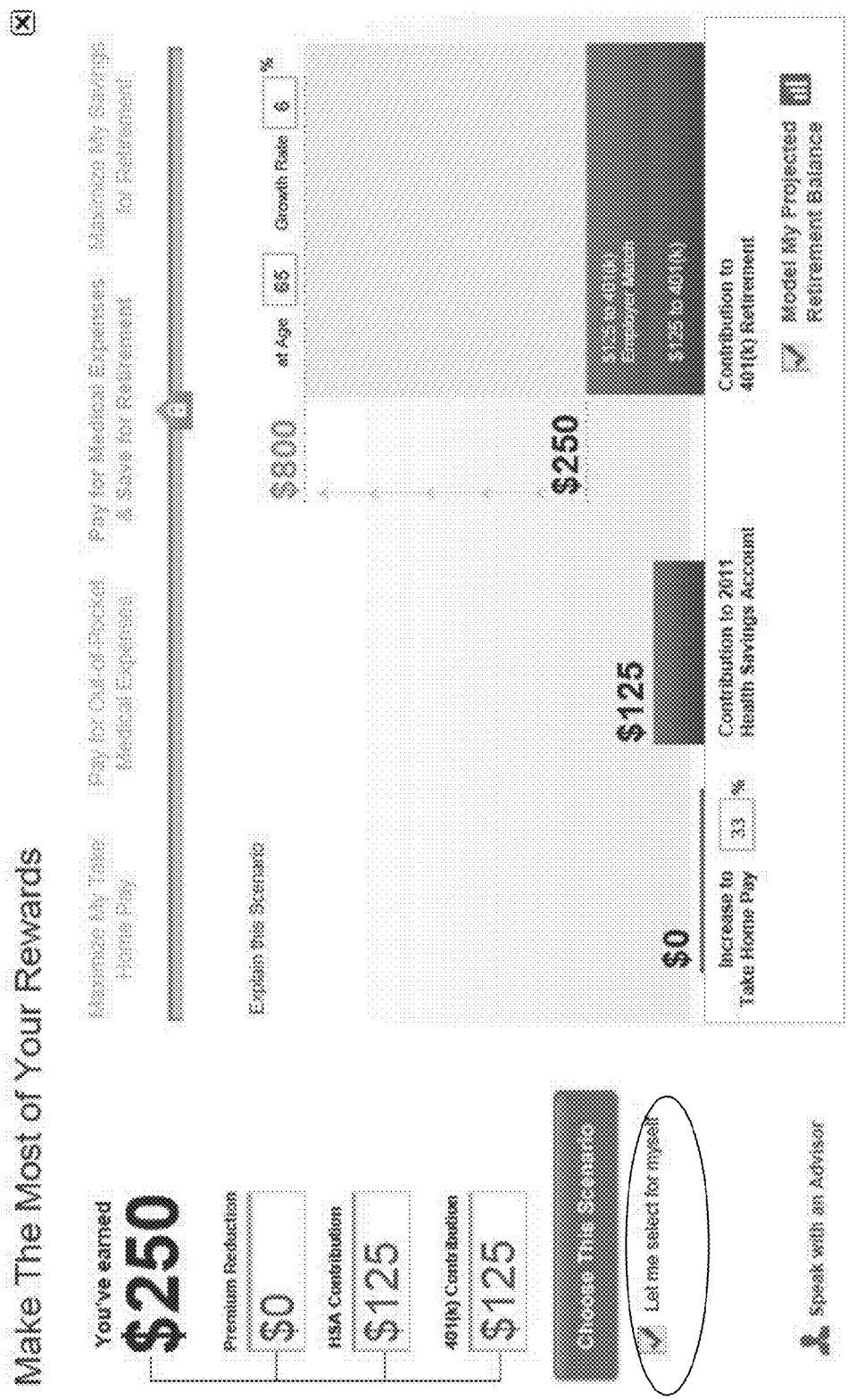
FIG. 8B illustrates one embodiment of the user interface with a sliding bar, in which the employee has selected to update contribution elections independent of benefit input received from a record keeping system and additionally selected to model the employee's projected retirement balance.
Figure 8C:
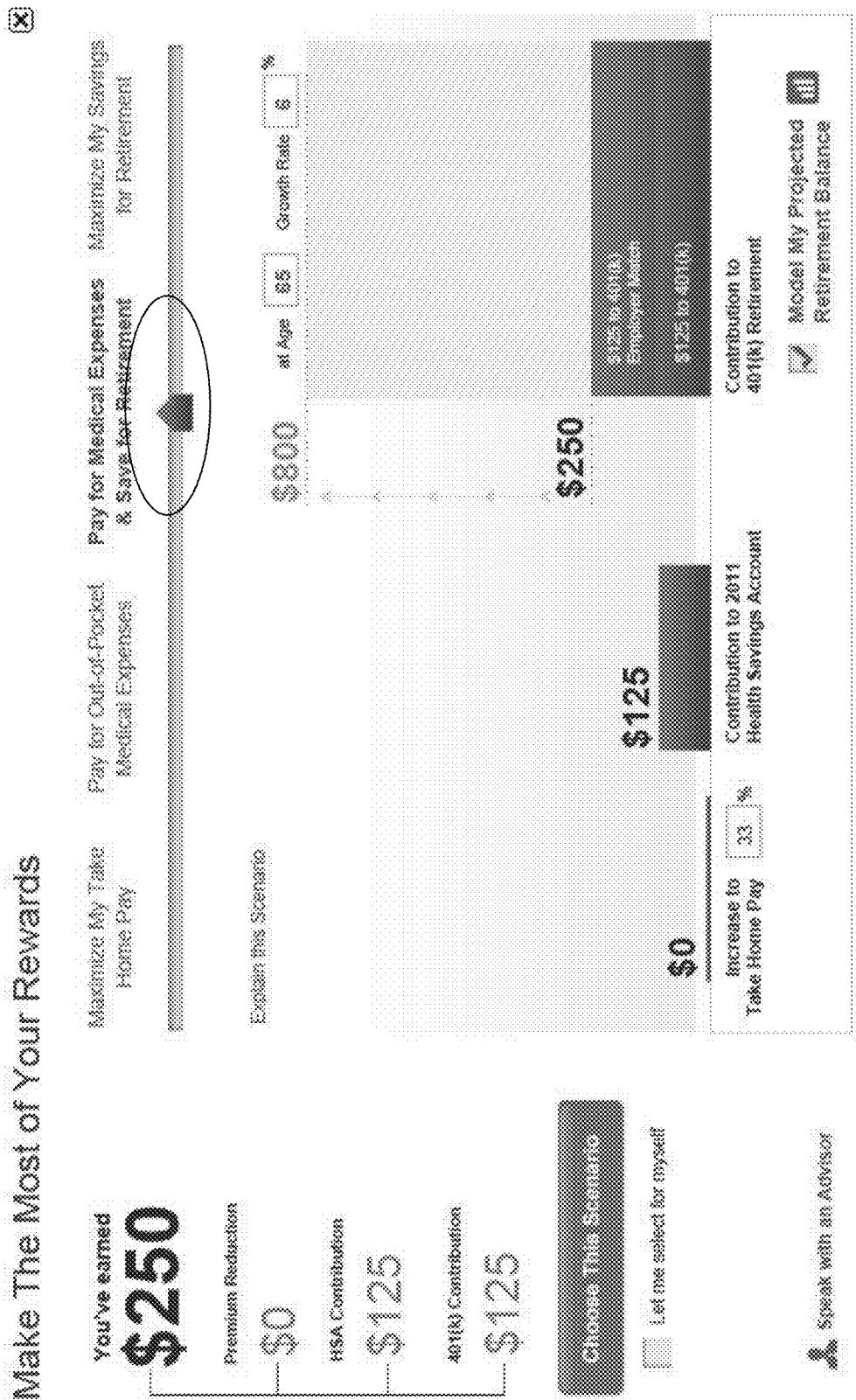
FIG. 8C illustrates one embodiment of the user interface with a sliding bar, in which the employee has de-selected to update contribution elections independent of benefit input received from a record keeping system thereby un-locking the sliding bar.

FIGS. 8A-8C show use of the "Let me select for myself" (i.e., select myself) radio button. In another embodiment, the user interface can be made more user friendly and engage the user further by allowing the user to determine how much of their incentive to allocate to each vehicle. By allowing the user to select these values themselves, i.e. inputting contributions amounts directly into the system via the user interface rather than the values being provided by the databases 320, the user further benefits from the system by viewing the direct results of increasing or decreasing their contribution amounts to various vehicles. As shown in FIG. 8A, when the user selects the select myself radio button, the slider bar is locked on the selected scenario and the allocation boxes for Premium Reduction, HSA Contribution and 401(k) Contribution become editable so the user can adjust these amounts directly for this scenario. Additionally, as shown in FIG. 8B this select myself radio button selection also allows the user to adjust the retirement age and growth rate, if the Model radio button is also selected. When the select myself radio button is selected 306, and the user independently inputs the incentive amounts allocated to each vehicle 309, the user must update these values 308, via the "Choose This Scenario" button, to save these elections 312-313. If the inputs are not updated, the inputs may be lost if the user exits the browser or user interface 310, 311, in which case the values on the user interface 270 when the user logs into the system again 301 are the previous or defaulted values pulled from the databases 330-334. If, however, the user selects to update these values 309 to their records 308 via the "Choose This Scenario" button, these values 309 are written back to the corresponding database 312. The next time the optimization engine 260 accesses data from the databases 314-320, the data pulled 330-335 is the updated data saved back to the databases 320.

When the select myself radio button is again deselected, as shown in FIG. 8C, the user interface unlocks the slider bar so that the user can again select amongst the various vehicles for allocating their incentives. Additionally, the contribution amounts become un-editable and are again determined by the data pulled from the table stored on the browser 337.

Figure 9A:
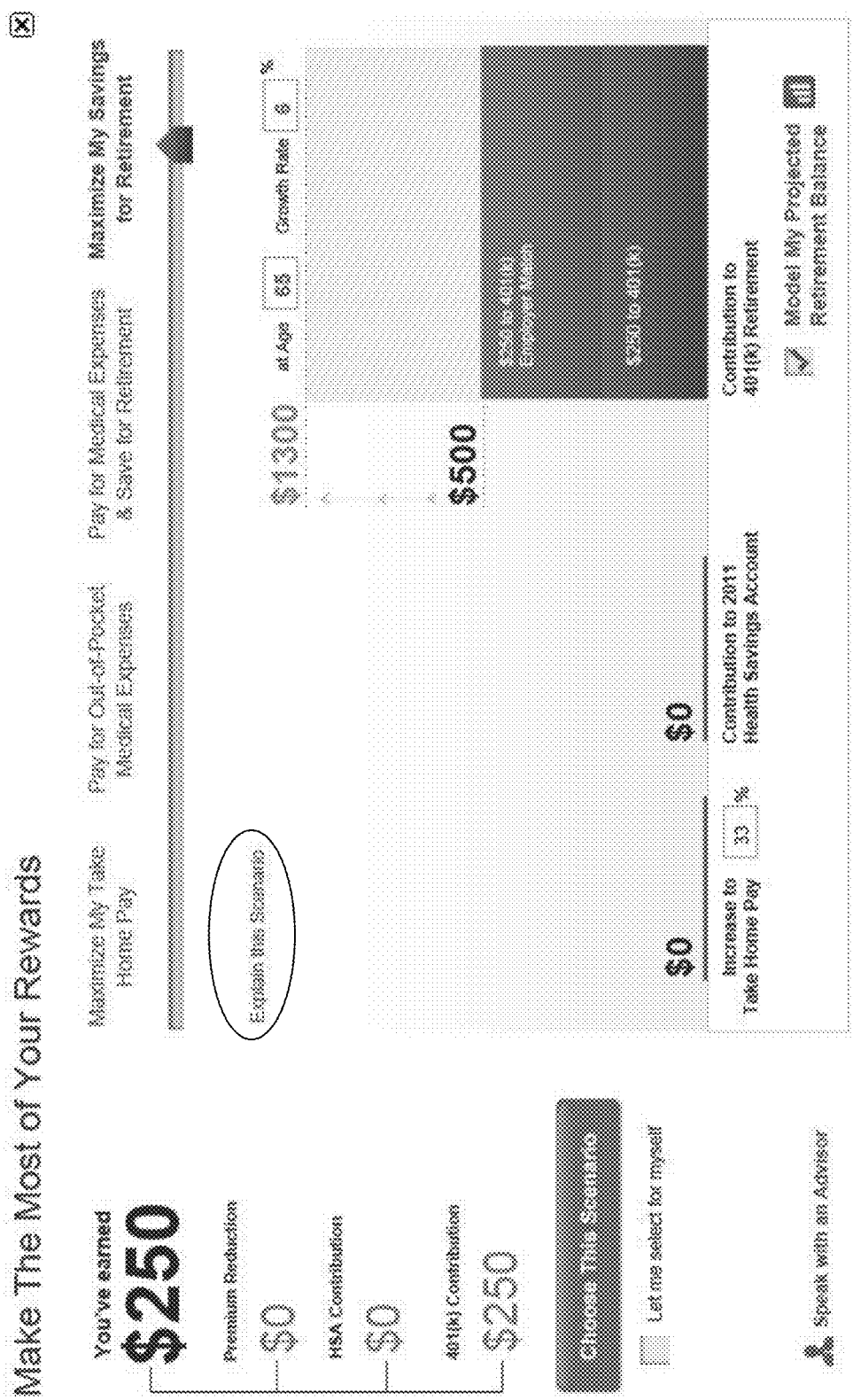
FIG. 9A illustrates one embodiment of the user interface with a sliding bar, in which the sliding bar is set to maximize the employee's savings for retirement and provides the calculated result based on input.
Figure 9B:
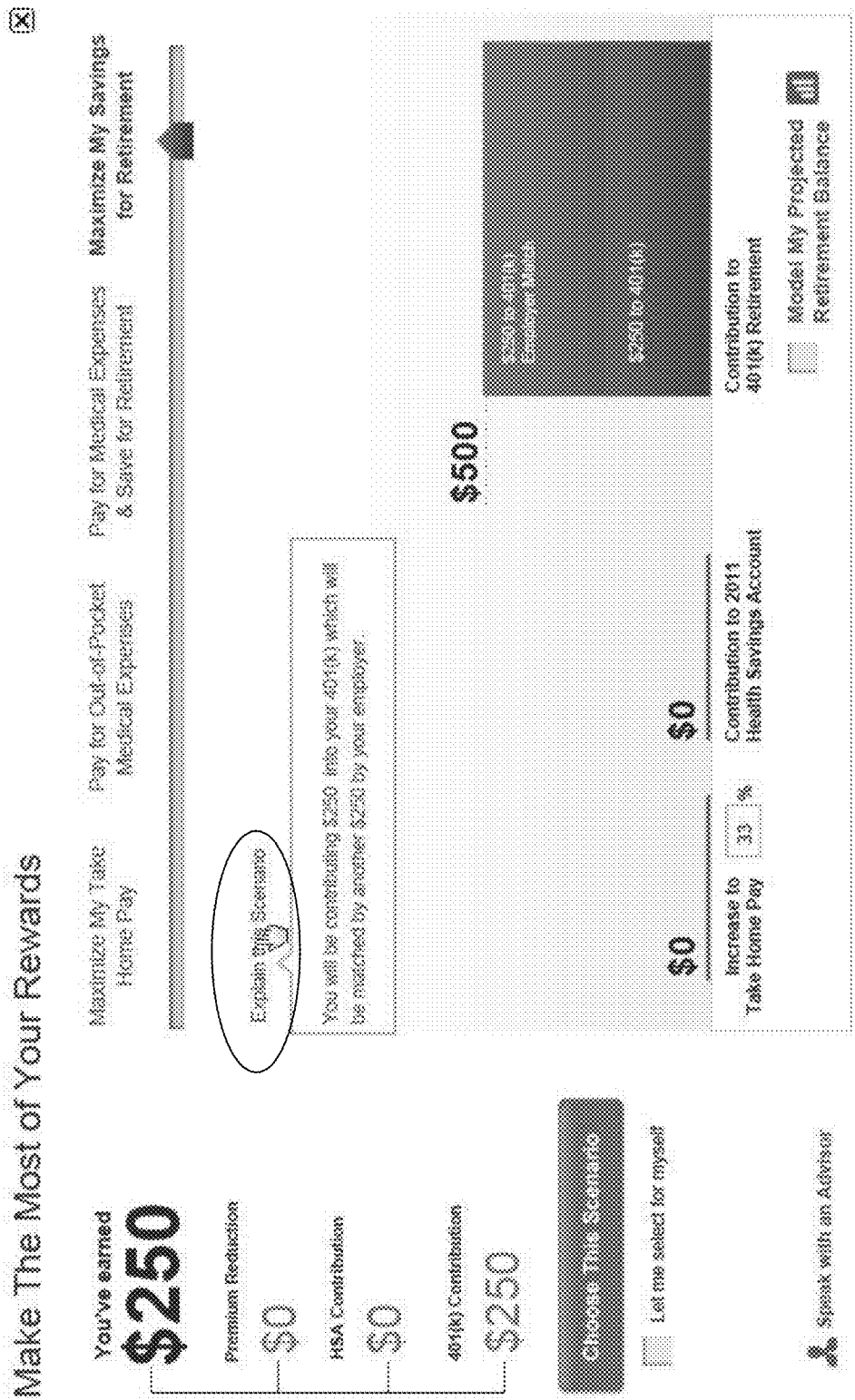
FIG. 9B illustrates one embodiment of the user interface with a sliding bar, in which the sliding bar is set to maximize the employee's savings for retirement, and a roll-over link is provided causing a pop-up window to appear, which explains the advantage of this selection.

FIGS. 9A and 9B show the selection tool moved to "Maximize My Savings for Retirement." FIG. 9A again shows that an employer match is available if at least a portion is allocated to retirement. Using this vehicle, the user only contributes to retirement accounts as seen by the $0 amounts in the medical HSA and take home pay fields. In FIG. 9A, the Model radio button is selected so that the projected retirement age and growth rate are shown and used to calculate the projected growth model of the allocation to retirement. In FIG. 9B, the rollover link has been activated and the advantages of this scenario selection are displayed for the user to aid in the user's understanding of this selection.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system (e.g., a cloud-computing system) that includes any combination of such back-end, middleware, or front-end components. The above described techniques can be implemented as a Software-As-A-Service (SaaS) model or using a multi-tiered approach.

Communication networks can include one or more packet-based networks and/or one or more circuit-based networks in any configuration. Packet-based networks can include, for example, an Ethernet-based network (e.g., traditional Ethernet as defined by the IEEE or Carrier Ethernet as defined by the Metro Ethernet Forum (MEF)), an ATM-based network, a carrier Internet Protocol (IP) network (LAN, WAN, or the like), a private IP network, an IP private branch exchange (IPBX), a wireless network (e.g., a Radio Access Network (RAN)), and/or other packet-based networks. Circuit-based networks can include, for example, the Public Switched Telephone Network (PSTN), a legacy private branch exchange (PBX), a wireless network (e.g., a RAN), and/or other circuit-based networks. Carrier Ethernet can be used to provide point-to-point connectivity (e.g., new circuits and TDM replacement), point-to-multipoint (e.g., IPTV and content delivery), and/or multipoint-to-multipoint (e.g., Enterprise VPNs and Metro LANs). Carrier Ethernet advantageously provides for a lower cost per megabit and more granular bandwidth options.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer, mobile device) with a world wide web browser (e.g., Microsoft® Internet Explorer® available from Microsoft Corporation, Mozilla® Firefox available from Mozilla Corporation).

One skilled in the art will realize the technology may be embodied in other specific forms without departing from the spirit or essential characteristics thereof. The foregoing embodiments are therefore to be considered in all respects illustrative rather than limiting of the technology described herein. All changes that come within the meaning and range of equivalency of the claims are therefore intended to be embraced therein.

What is claimed is:

1. A method of allowing employees to allocate financial incentives for employee wellness programs, comprising:
   receiving, by a computing device, input about the employee receiving a financial incentive for participating in or completing a wellness activity, the input including an amount of the financial incentive, wherein the wellness activity comprises one or more of health risk assessments, prevention activities, behavior modification program participation, chronic condition management or health education program participation;
   determining, by the computing device, a plurality of vehicles associated with the employee that are eligible to receive contributions from the financial incentive, wherein the plurality of vehicles comprise one or more of a retirement plan, a health savings account (HSA), cash, cash equivalent rewards, or health care premium reductions;
   calculating, by the computing device, financial data for a plurality of scenarios, each scenario corresponding to different contributions of the financial incentive respectively allocated to one or more of the plurality of vehicles and the financial data representing financial growth of the vehicles for that scenario, wherein the plurality of scenarios include one or more of maximizing take home pay, paying for out of pocket medical expenses, paying medical expenses, apportioning payment for medical expenses while saving for retirement and maximizing savings for retirement and allocating payment toward an HSA;
   providing, by the computing device to a user device, a user interface that displays the plurality of scenarios for comparison, wherein a user can choose from amongst the plurality of scenarios graphically showing the financial growth of the vehicles for a selected scenario and compare different contributions of the financial incentive among the vehicles,
   further providing, by the computing device, the user interface with a selection tool for applying the financial incentive to one or more of the plurality of vehicles according to the selected scenario after the comparison;
   receiving, by the computing device, via the selection tool, a selection of the one or more vehicles for applying the financial incentive; and
   applying the financial incentive to the one or more selected vehicles according to the selected scenario.

2. The method of claim 1 wherein the user interface comprises a first section for displaying the selection tool and a second section displaying the plurality of scenarios.

3. The method of claim 1 further comprising displaying a user-activated link that provides information indicating advantages associated with a displayed one of the plurality of scenarios.

4. The method of claim 3 wherein the user-activated link is a roll-over link that displays a pop-up window including text explaining the advantages associated with a displayed one of the plurality of scenarios.

5. The method of claim 1 further comprising retrieving information from one or more benefit and healthcare system databases, including at least one of salary information, tax rate information, retirement plan contribution information, estimates for medical expenses, employer match information, a growth rate, age, and years to retirement or other benefits program information.

6. The method of claim 1, wherein the determining step further comprising calculating the indication of eligibility by the computing device based on the input.

7. The method of claim 1 further comprising calculating a potential growth of the amount of the financial incentive of the vehicles for a selected scenario, and displaying a statement regarding the potential growth and advantages of the vehicles for a selected scenario.

8. The method of claim 1 further comprising calculating the financial incentive based on the wellness activity, wherein the wellness activity includes participating in or completing the wellness activity or attaining a health benchmark associated with the wellness activity.

9. The method of claim 1 further comprising: receiving, by the computing device, an indication of a limit for the financial incentive for the plurality of vehicles to which the financial incentive can be assigned, the plurality vehicles including a pre-tax vehicle and at least one other vehicle, wherein the limit is based on plan rules; and determining, by the computing device, to which of the plurality of vehicles the financial incentives must be limited based on the plan rules.

10. The method of claim 1 wherein the amount of the financial incentive is an anticipated amount.

11. The method of claim 1 wherein the amount of the financial incentive is an amount earned by the user.

12. A computer program product, tangibly embodied in a machine readable storage device, the computer program product including instructions being operable to cause a data processing apparatus to:

receive input about the employee receiving a financial incentive dependent on completing a wellness activity, the input including an amount of the financial incentive, wherein the wellness activity comprises one or more of health risk assessments, prevention activities, behavior modification program participation, chronic condition management or health education program participation;

determine a plurality of vehicles associated with the employee that are eligible to receive contributions from the financial incentive, wherein the plurality of vehicles comprise one or more of a retirement plan, a health savings account (HSA), cash, cash equivalent rewards, or health care premium reductions;

calculate financial data for a plurality of scenarios, each scenario corresponding to different contributions of the financial incentive respectively allocated to one or more of the plurality of vehicles and the financial data representing financial growth of the vehicles for that scenario, wherein the plurality of scenarios include one or more of maximizing take home pay, paying for out of pocket medical expenses, paying medical expenses, apportioning payment for medical expenses while saving for retirement and maximizing savings for retirement and allocating payment toward an HSA;

provide a user interface that displays the plurality of scenarios for comparison, wherein a user can choose from amongst the plurality of scenarios graphically showing the financial growth of the vehicles for a selected scenario and compare different contributions of the financial incentive among the vehicles;

further provide the user interface with a selection tool to apply the financial incentive to one or more of the plurality of vehicles according to the selected scenario after the comparison;

receive, via the selection tool, a selection of the one or more vehicles to apply to the financial incentive; and apply the financial incentive to the one or more of the plurality of vehicles according to the selected scenario.

13. The computer program product of claim 12 wherein the user interface comprises a first section displaying the selection tool and a second section displaying the plurality of scenarios for comparison.

14. The computer program product of claim 13 wherein the user interface provides information indicating advantages associated with a displayed one of the plurality of scenarios.

15. The computer program product of claim 14 wherein the user-activated link is a roll-over link that displays a pop-up window including text explaining the advantages associated with a displayed one of the plurality of scenarios.

16. The computer program product of claim 14 comprising further instructions to calculate a potential growth of the amount of the financial incentive of the vehicles for a selected scenario, and displaying a statement regarding the potential growth and advantages of the vehicles for a selected scenario.

17. The computer program product of claim 12 comprising further instructions to retrieve information from one or more benefit and healthcare system databases, including at least one of salary information, tax rate information, retirement plan contribution information, estimates for medical expenses, employer match information, a growth rate, age, and years to retirement or other benefits program information.

18. The computer program product of claim 12 comprising further instructions to calculate the indication of eligibility based on the input.

19. The computer program product of claim 12 comprising further instructions to calculate the financial incentive based on the wellness activity, where in the wellness activity includes participating in or completing the wellness activity or attaining a health benchmark associated with the wellness activity.

20. The computer program product of claim 12 comprising further instructions to:
receive an indication of a limit for the financial incentive for the plurality of vehicles to which the financial incentive can be assigned, the one or more vehicles including a pre-tax vehicle and at least one other vehicle, wherein the limit is based on plan rules; and
determine to which of the plurality of vehicles the financial incentives must be limited based on the plan rules.

21. The computer program product of claim 12 wherein the amount of the financial incentive is an anticipated amount.

22. The computer program product of claim 12 wherein the amount of the financial incentive is an amount earned by the user.

* * * * *